(12) United States Patent
Deng et al.

(10) Patent No.: US 11,285,907 B1
(45) Date of Patent: Mar. 29, 2022

(54) RESTRAINT SYSTEM

(71) Applicant: Ford Global Technologies, LLC, Dearborn, MI (US)

(72) Inventors: Zhibing Deng, Northville, MI (US); Joseph E. Abramczyk, Farmington Hills, MI (US); Deepak Patel, Canton, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 17/030,468

(22) Filed: Sep. 24, 2020

(51) Int. Cl.
| | |
|---|---|
| *B60R 21/232* | (2011.01) |
| *B60R 21/203* | (2006.01) |
| *B60R 21/213* | (2011.01) |
| *B60R 21/231* | (2011.01) |
| *B60R 21/2338* | (2011.01) |
| *B60R 21/237* | (2006.01) |
| *B60R 21/235* | (2006.01) |

(52) U.S. Cl.
CPC .......... *B60R 21/232* (2013.01); *B60R 21/203* (2013.01); *B60R 21/213* (2013.01); *B60R 21/237* (2013.01); *B60R 21/2338* (2013.01); *B60R 21/23138* (2013.01); *B60R 2021/23386* (2013.01); *B60R 2021/23538* (2013.01); *B60R 2021/23542* (2013.01)

(58) Field of Classification Search
CPC .... B60R 2021/0009; B60R 2021/0023; B60R 2021/0048; B60R 2021/23107; B60R 2021/23308; B60R 2021/23316; B60R 2021/23386; B60R 2021/23538; B60R 2021/23542; B60R 21/203; B60R 21/213; B60R 21/23138; B60R 21/232; B60R 21/2338; B60R 21/237

See application file for complete search history.

(56) References Cited

U.S. PATENT DOCUMENTS

| | | | |
|---|---|---|---|
| 6,234,516 B1 * | 5/2001 | Boxey .................. | B60R 21/232 280/729 |
| 6,338,498 B1 * | 1/2002 | Niederman ........... | B60R 21/213 280/728.2 |

(Continued)

FOREIGN PATENT DOCUMENTS

| | | | |
|---|---|---|---|
| JP | 2014166798 A | * | 9/2014 |
| JP | 2016188056 A | * | 11/2016 |

(Continued)

*Primary Examiner* — Laura Freedman
(74) *Attorney, Agent, or Firm* — Frank A. MacKenzie; Bejin Bieneman PLC

(57) ABSTRACT

A restraint system includes a side curtain airbag including an inboard panel, an outboard panel, and a perimeter at which the inboard panel and the outboard panel are connected to each other. The side curtain airbag includes a main portion formed of part of the inboard panel and part of the outboard panel, and a folded-over portion formed of part of the inboard panel and part of the outboard panel. The main portion and the folded-over portion each include a dead zone spaced from the perimeter at which the inboard panel and the outboard panel are connected to each other. The side curtain airbag is folded so that the inboard panel of the folded-over portion abuts the inboard panel of the main portion. The main portion and the folded-over portion are attached to each other via the respective dead zones.

17 Claims, 10 Drawing Sheets

(56) References Cited

U.S. PATENT DOCUMENTS

| | | | | |
|---|---|---|---|---|
| 6,361,068 B1 * | 3/2002 | Stein | B60R 21/232 | 280/730.2 |
| 6,460,878 B2 * | 10/2002 | Eckert | B60R 21/232 | 280/730.1 |
| 6,565,118 B2 * | 5/2003 | Bakhsh | B60R 21/232 | 280/730.2 |
| 6,695,342 B2 * | 2/2004 | Tanase | B60R 21/213 | 280/730.2 |
| 7,823,922 B2 * | 11/2010 | Mitchell | B60R 21/232 | 280/743.2 |
| 7,988,187 B2 * | 8/2011 | Yamamura | B60R 21/232 | 280/730.2 |
| 8,186,710 B2 * | 5/2012 | Cheal | B60R 21/213 | 280/730.2 |
| 8,282,124 B2 | 10/2012 | Trovato et al. | | |
| 8,414,014 B2 * | 4/2013 | Nogami | B60R 21/2338 | 280/728.2 |
| 8,414,021 B2 * | 4/2013 | Tanaka | B60R 21/232 | 280/730.2 |
| 8,636,301 B1 * | 1/2014 | Wang | B60R 21/2338 | 280/730.2 |
| 8,764,053 B1 * | 7/2014 | Dix | B60R 21/232 | 280/730.1 |
| 8,882,139 B2 * | 11/2014 | Kawamura | B60R 21/23138 | 280/730.2 |
| 8,894,094 B2 * | 11/2014 | Wang | B60R 21/2338 | 280/730.2 |
| 8,967,660 B2 * | 3/2015 | Taguchi | B60R 21/232 | 280/729 |
| 8,998,250 B2 | 4/2015 | Kruse et al. | | |
| 9,108,588 B2 * | 8/2015 | Fukawatase | B60R 21/233 | |
| 9,114,777 B2 * | 8/2015 | Fukawatase | B60R 21/233 | |
| 9,126,558 B2 * | 9/2015 | Kawamura | B60R 21/213 | |
| 9,156,427 B2 * | 10/2015 | Wang | B60R 21/2338 | |
| 9,421,941 B2 * | 8/2016 | Jo | B60R 21/232 | |
| 9,487,180 B2 * | 11/2016 | Nakashima | B60R 21/213 | |
| 9,539,978 B2 * | 1/2017 | Mazanek | B60R 21/23138 | |
| 9,771,046 B2 * | 9/2017 | Lee | B60R 21/239 | |
| 9,862,347 B2 * | 1/2018 | Deng | B60R 21/203 | |
| 9,914,423 B2 | 3/2018 | Kim et al. | | |
| 9,994,184 B2 * | 6/2018 | Deng | B60R 21/0136 | |
| 10,106,119 B2 * | 10/2018 | Oh | B60R 21/2338 | |
| 10,870,407 B2 * | 12/2020 | Jung | B60R 21/203 | |
| 10,974,681 B2 * | 4/2021 | Rathgeb | B60R 21/233 | |
| 2002/0140209 A1 * | 10/2002 | Waid | B60R 21/232 | 280/728.2 |
| 2014/0203541 A1 * | 7/2014 | Wei | B60R 21/233 | 280/730.2 |
| 2014/0217709 A1 * | 8/2014 | Fukawatase | B60R 21/232 | 280/730.2 |
| 2016/0023626 A1 * | 1/2016 | Hiruta | B60R 21/231 | 280/728.2 |
| 2016/0200281 A1 * | 7/2016 | Takeshita | B62D 1/11 | 280/730.2 |
| 2019/0275977 A1 * | 9/2019 | Lee | B60R 21/232 | |

FOREIGN PATENT DOCUMENTS

| | | |
|---|---|---|
| JP | 6108973 B2 | 4/2017 |
| WO | 2017171334 A1 | 10/2017 |

\* cited by examiner

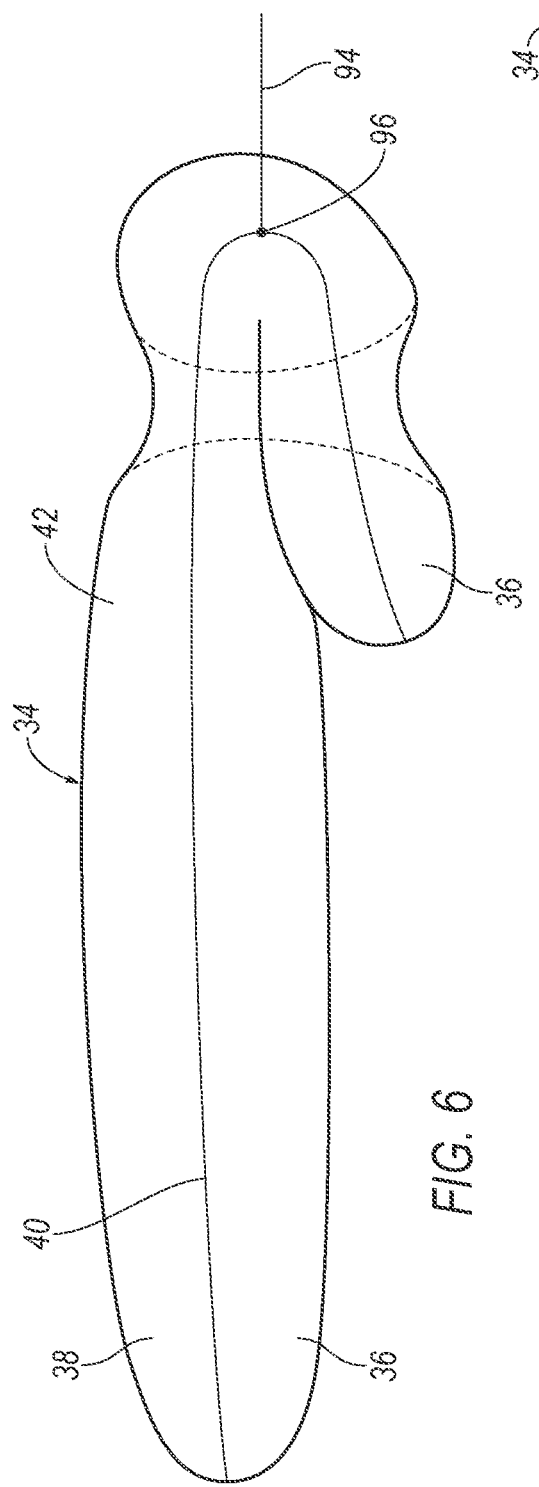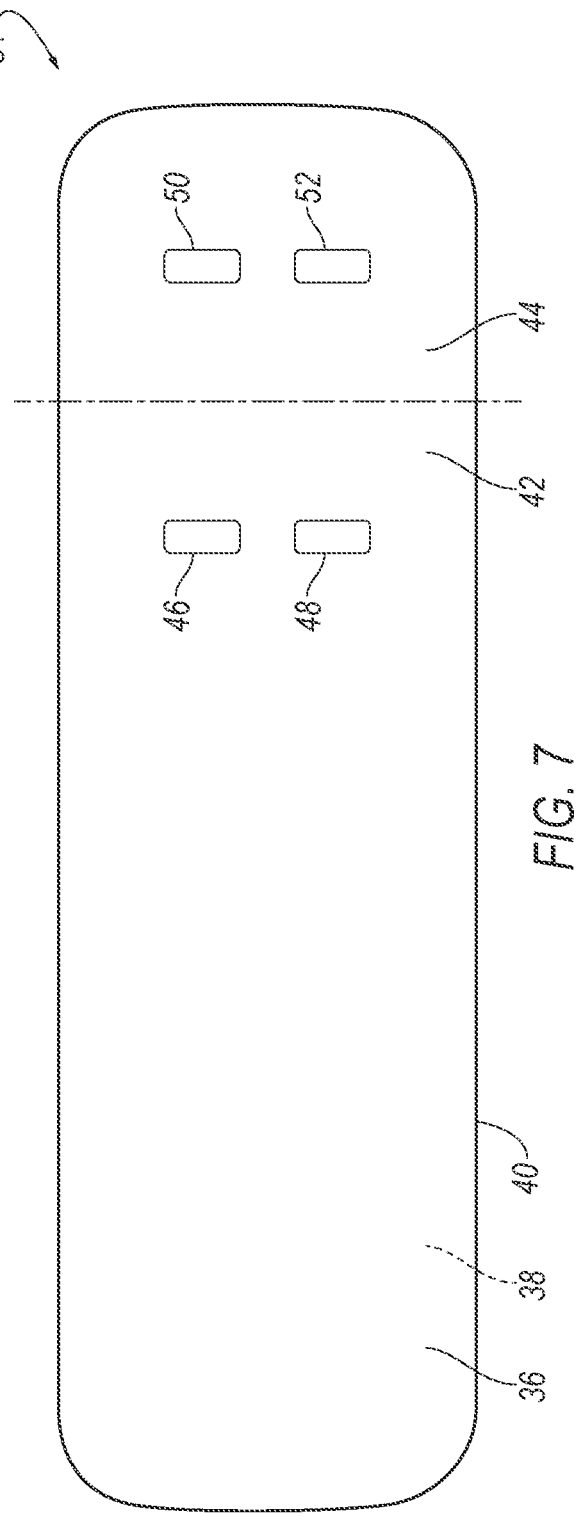
FIG. 6
FIG. 7

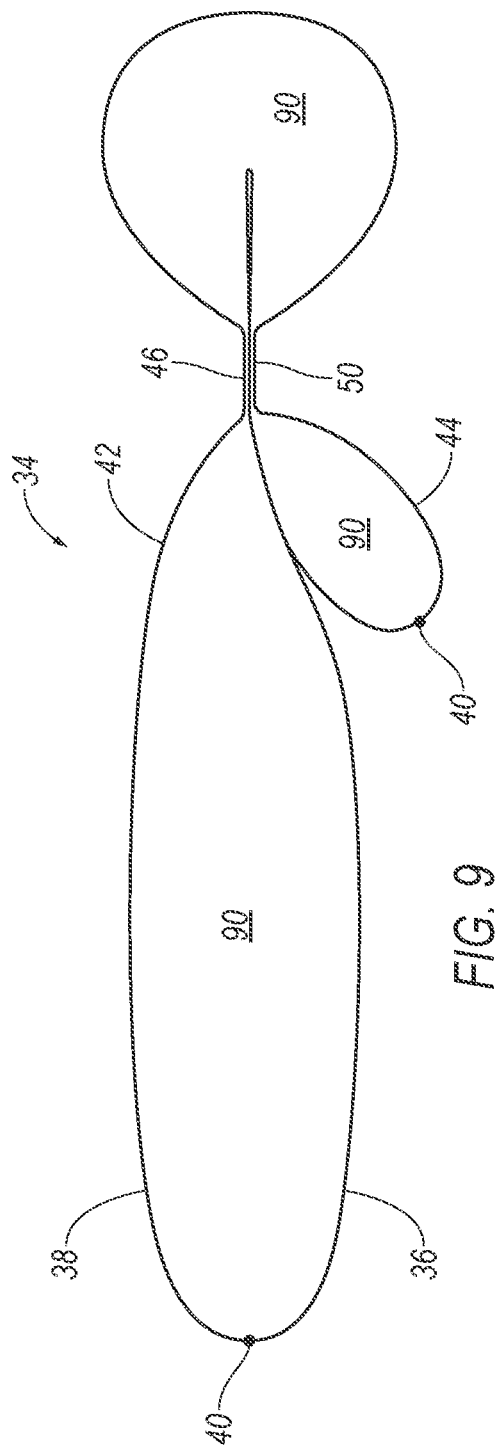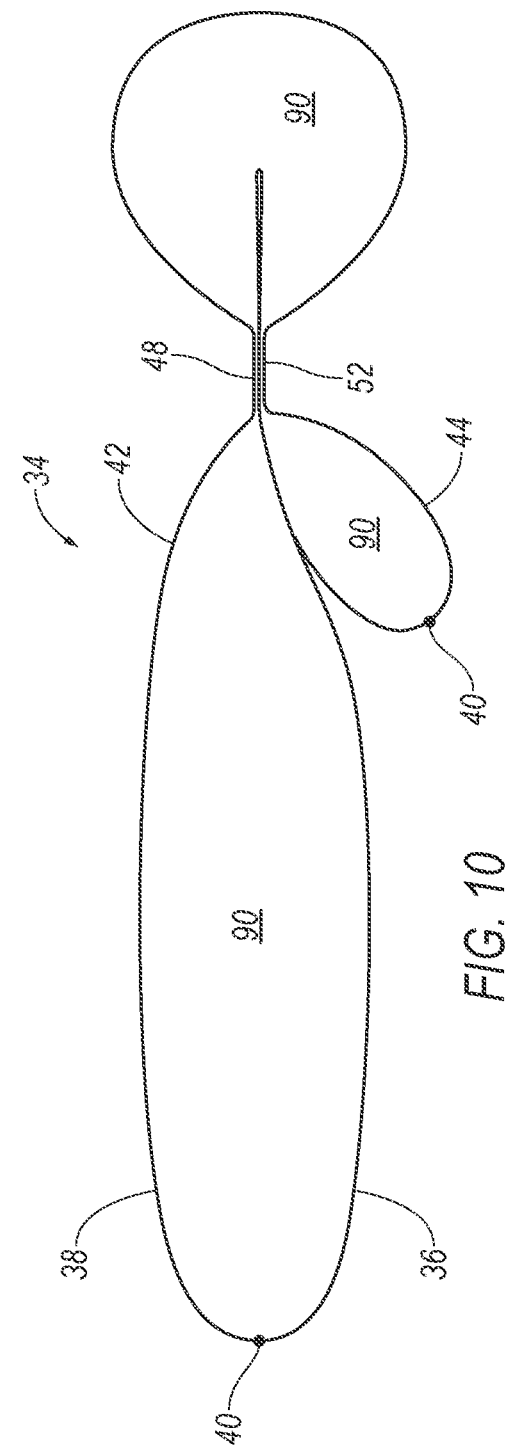
FIG. 9
FIG. 10

RESTRAINT SYSTEM

BACKGROUND

Vehicles are equipped with airbags. In the event of an impact, an inflator activates and provides inflation medium to the airbags pressurize and act as cushions for occupants during the impact. The airbags are located at various fixed positions in passenger cabins of vehicles. Vehicles typically include a driver airbag mounted in the steering wheel, a passenger airbag mounted in the dashboard in a vehicle-forward direction from the front passenger seat, and side curtain airbags mounted in the roof rails.

BRIEF DESCRIPTION OF THE DRAWINGS

FIG. 6 is a top view of the side curtain airbag in the inflated position.
FIG. 7 is a side view of the side curtain airbag in an unfolded position.
FIG. 9 is another top cross-sectional view of the side curtain airbag in the inflated position.
FIG. 10 is another top cross-sectional view of the side curtain airbag in the inflated position.

DETAILED DESCRIPTION

Figure 1:
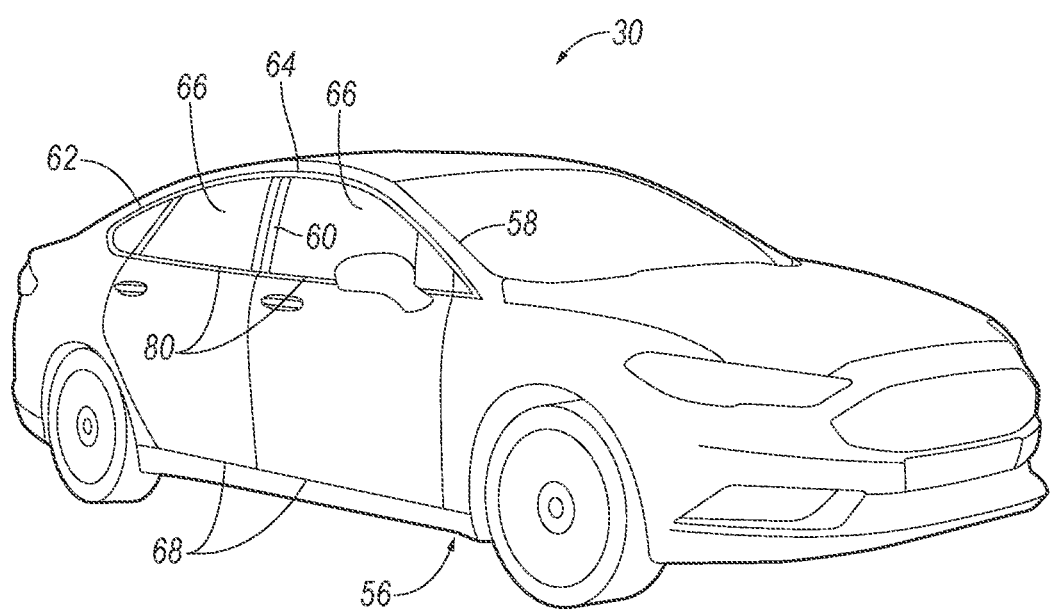
FIG. 1 is a perspective view of a vehicle.

A side curtain airbag includes an inboard panel, an outboard panel, a perimeter at which the inboard panel and the outboard panel are connected to each other, a main portion including part of the inboard panel and part of the outboard panel, and a folded-over portion including part of the inboard panel and part of the outboard panel. The main portion includes a main-portion dead zone at which the inboard panel and the outboard panel are connected to each other, and the main-portion dead zone is spaced from the perimeter. The folded-over portion includes a folded-over-portion dead zone at which the inboard panel and the outboard panel are connected to each other, and the folded-over-portion dead zone is spaced from the perimeter. The inboard panel of the folded-over portion abuts the inboard panel of the main portion. The main portion and the folded-over portion are attached to each other at the main-portion dead zone and the folded-over-portion dead zone.

The inboard panel and the outboard panel may enclose an inflation chamber, and the inflation chamber may extend through the main portion and the folded-over portion. The side curtain airbag may further include a tether attaching the main-portion dead zone and the folded-over portion dead zone, and the tether may extend outside the inflation chamber.

The main-portion dead zone and the folded-over-portion dead zone may be one of stitched together or woven together.

The side curtain airbag may further include a sail panel connected to the side curtain airbag. The sail panel may be connected to the side curtain airbag where the inboard panel and the outboard panel transition from the main portion to the folded-over portion.

The sail panel may be connected to the perimeter of the side curtain airbag. The sail panel may be connected to the side curtain airbag only at an upper connection point on the perimeter and at a lower connection point on the perimeter.

The main-portion dead zone may be a first main-portion dead zone, the main portion may include a second main-portion dead zone, the folded-over-portion dead zone may be a first folded-over-portion dead zone, the folded-over portion may include a second folded-over-portion dead zone, and the main portion and the folded-over portion may be attached to each other via the respective second dead zones. The side curtain airbag may be inflatable to an inflated position, the first and second main-portion dead zones may be spaced from each other in a vertical direction of the side curtain airbag when the side curtain airbag is in the inflated position, and the first and second folded-over-portion dead zones may be spaced from each other in a vertical direction of the side curtain airbag when the side curtain airbag is in the inflated position.

The side curtain airbag may be inflatable to an inflated position, and the main portion may be at least twice as long as the folded-over portion along a vehicle-forward direction of the side curtain airbag when the side curtain airbag is in the inflated position.

The perimeter of the main portion may be disconnected from the perimeter of the folded-over portion except where the perimeter transitions from the main portion to the folded-over portion.

A system includes a side curtain airbag including an inboard panel, an outboard panel, a perimeter at which the inboard panel and the outboard panel are connected to each other, a main portion including part of the inboard panel and part of the outboard panel, and a folded-over portion including part of the inboard panel and part of the outboard panel; a roof-rail trim enclosing the side curtain airbag; a steering wheel coupled to the roof-rail trim; and a driver airbag enclosed in the steering wheel. The main portion includes a main-portion dead zone at which the inboard panel and the outboard panel are connected to each other, and the main-portion dead zone are spaced from the perimeter. The folded-over portion includes a folded-over-portion dead zone at which the inboard panel and the outboard panel are connected to each other, and the folded-over-portion dead zone is spaced from the perimeter. The inboard panel of the folded-over portion abuts the inboard panel of the main portion. The main portion and the folded-over portion are attached to each other at the main portion dead zone and the folded-over portion dead zone.

The side curtain airbag and the driver airbag may be inflatable to inflated positions, and when the side curtain airbag and the driver airbag are in the inflated positions, the folded-over portion may extend farther in a vehicle-rearward direction than the driver airbag does.

The side curtain airbag and the driver airbag may be inflatable to inflated positions, and when the side curtain airbag and the driver airbag are in the inflated positions, the outboard panel of the folded-over portion may contact the driver airbag.

The folded-over portion may be connected to the main portion at a vehicle-forward end of the main portion.

The side curtain airbag may be inflatable to an inflated position, and the side curtain airbag may cover a window opening adjacent the roof-rail trim when the side curtain airbag is in the inflated position.

With reference to the Figures, a restraint system 32 for a vehicle 30 includes a side curtain airbag 34 including an inboard panel 36, an outboard panel 38, and a perimeter 40 at which the inboard panel 36 and the outboard panel 38 are connected to each other. The perimeter 40 defines outer edges of the inboard panel 36 and of the outboard panel 38. The side curtain airbag 34 includes a main portion 42 formed of part of the inboard panel 36 and part of the outboard panel 38, and a folded-over portion 44 formed of part of the inboard panel 36 and part of the outboard panel 38. The main portion 42 includes a first main-portion dead zone 46 at which the inboard panel 36 and the outboard panel 38 are connected to each other. The first main-portion dead zone 46 is spaced from the perimeter 40. The folded-over portion 44 includes a first folded-over-portion dead zone 50 at which the inboard panel 36 and the outboard panel 38 are connected to each other. The first folded-over-portion dead zone 50 is spaced from the perimeter 40. The side curtain airbag 34 is folded so that the inboard panel 36 of the folded-over portion 44 abuts the inboard panel 36 of the main portion 42. The main portion 42 and the folded-over portion 44 are attached to each other via the respective first dead zones 46, 50.

The restraint system 32 can reduce a chance that the head of the driver of the vehicle 30 passes between the side curtain airbag 34 and a driver airbag 54 during an oblique impact to the vehicle 30. Specifically, during an oblique impact, e.g., a small overlap rigid barrier (SORB) test, the head of the driver can land between the main portion 42 and the folded-over portion 44 of the side curtain airbag 34, which may reduce how much farther the head travels forward. Moreover, the design of the side curtain airbag 34 makes the side curtain airbag 34 easy to manufacture, including because the airbag is formed of just the inboard panel 36 and outboard panel 38, the folded-over shape, and the attachment of the folded-over portion 44 to the main portion 42 via the dead zones 46, 48, 50, 52.

With reference to FIG. 1, the vehicle 30 may be any passenger or commercial automobile such as a car, a truck, a sport utility vehicle, a crossover, a van, a minivan, a taxi, a bus, etc. The vehicle 30 includes a body 56. The vehicle 30 may be of a unibody construction, in which a frame and the body 56 of the vehicle 30 are a single component. The vehicle 30 may, alternatively, be of a body-on-frame construction, in which the frame supports the body 56 that is a separate component from the frame. The frame and the body 56 may be formed of any suitable material, for example, steel, aluminum, etc.

The body 56 of the vehicle 30 may include A pillars 58, B pillars 60, C pillars 62, and roof rails 64. The A pillars 58 may extend between a windshield and windows 66. The B pillars 60 may extend between windows 66 of adjacent doors 68. The C pillars 62 may extend between the windows 66 and a rear windshield. The body 56 may also include D pillars (not shown) if the vehicle 30 is, e.g., an SUV, crossover, minivan, or station wagon, in which case the C pillars 62 extend between the windows 66 of rear doors 68 and rear left and right windows 66, and the D pillars extend between the rear right and left windows 66 and the rear windshield. The roof rails 64 extend along the windows 66 from the A pillar 58 to the B pillar 60 to the C pillar 62.

Figure 2:
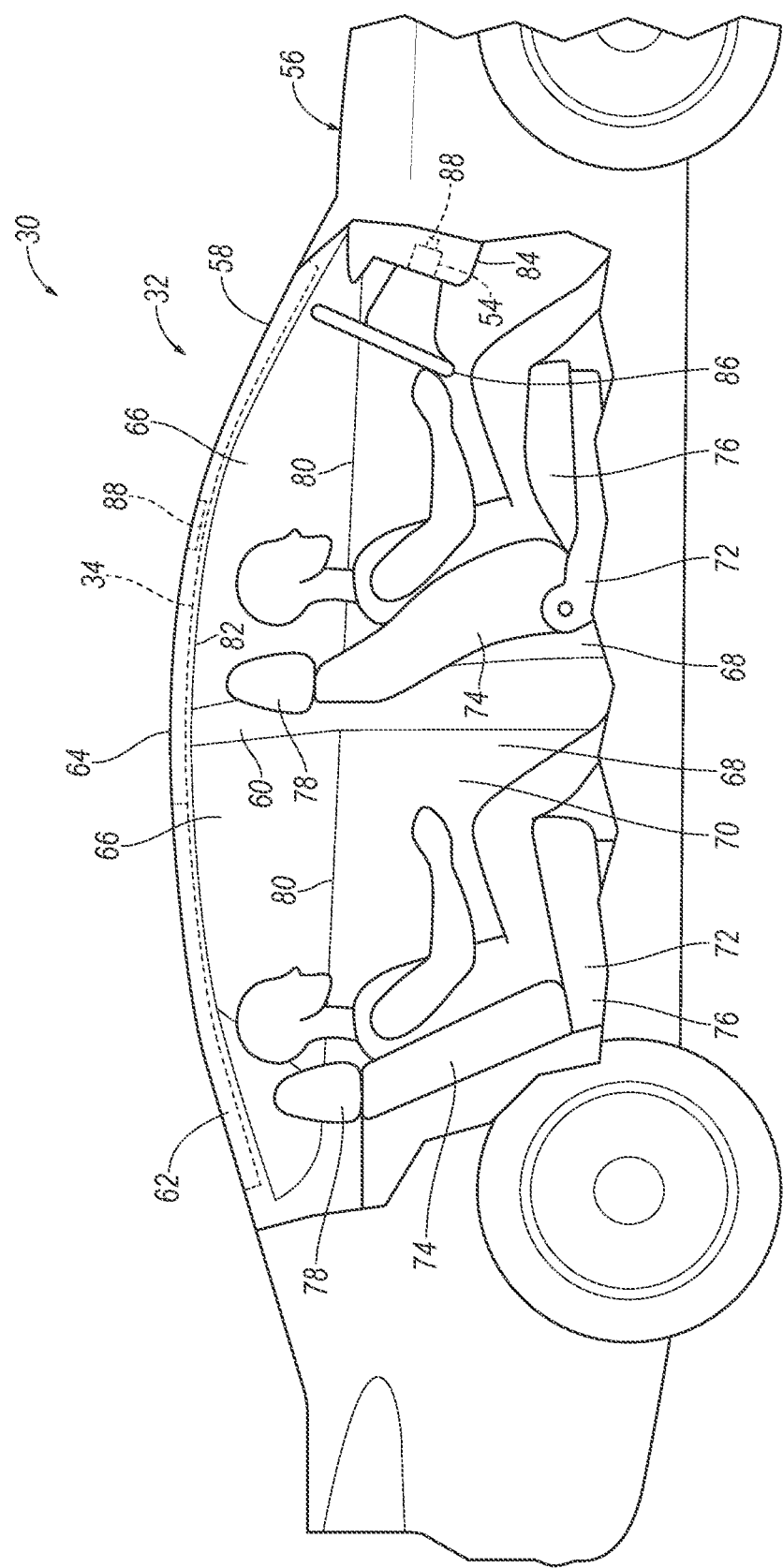
FIG. 2 is a side view of a passenger cabin of the vehicle.

With reference to FIG. 2, the vehicle 30 includes a passenger cabin 70 to house occupants, if any, of the vehicle 30. The passenger cabin 70 includes one or more front seats 72 disposed at a front of the passenger cabin 70 and one or more back seats 72 disposed behind the front seats 72. The passenger cabin 70 may also include third-row seats 72 (not shown) at a rear of the passenger cabin 70. In FIG. 1, the front seat 72 is shown to be a bucket seat, but the seats 72 may be other types. The position and orientation of the seats 72 and components thereof may be adjustable by an occupant.

Each seat 72 may include a seat back 74, a seat bottom 76, and a head restraint 78. The head restraint 78 may be supported by the seat back 74 and may be stationary or movable relative to the seat back 74. The seat back 74 may be supported by the seat bottom 76 and may be stationary or movable relative to the seat bottom 76. The seat back 74, the seat bottom 76, and/or the head restraint 78 may be adjustable in multiple degrees of freedom. Specifically, the seat back 74, the seat bottom 76, and/or the head restraint 78 may themselves be adjustable, in other words, adjustable components within the seat back 74, the seat bottom 76, and/or the head restraint 78, and/or may be adjustable relative to each other.

The vehicle 30 includes the doors 68 openable for occupants to enter and exit the passenger cabin 70. Each door 68 includes a respective window opening 80, which may be positioned in an upper half of the door 68 and which one of the windows 66 may fill. The roof rails 64 contact a top edge of the doors 68. The vehicle 30 may include two roof rail trims 82 each elongated along a right edge and left edge respectively of a ceiling of the passenger cabin 70 covering respective roof rails 64.

Figure 3:
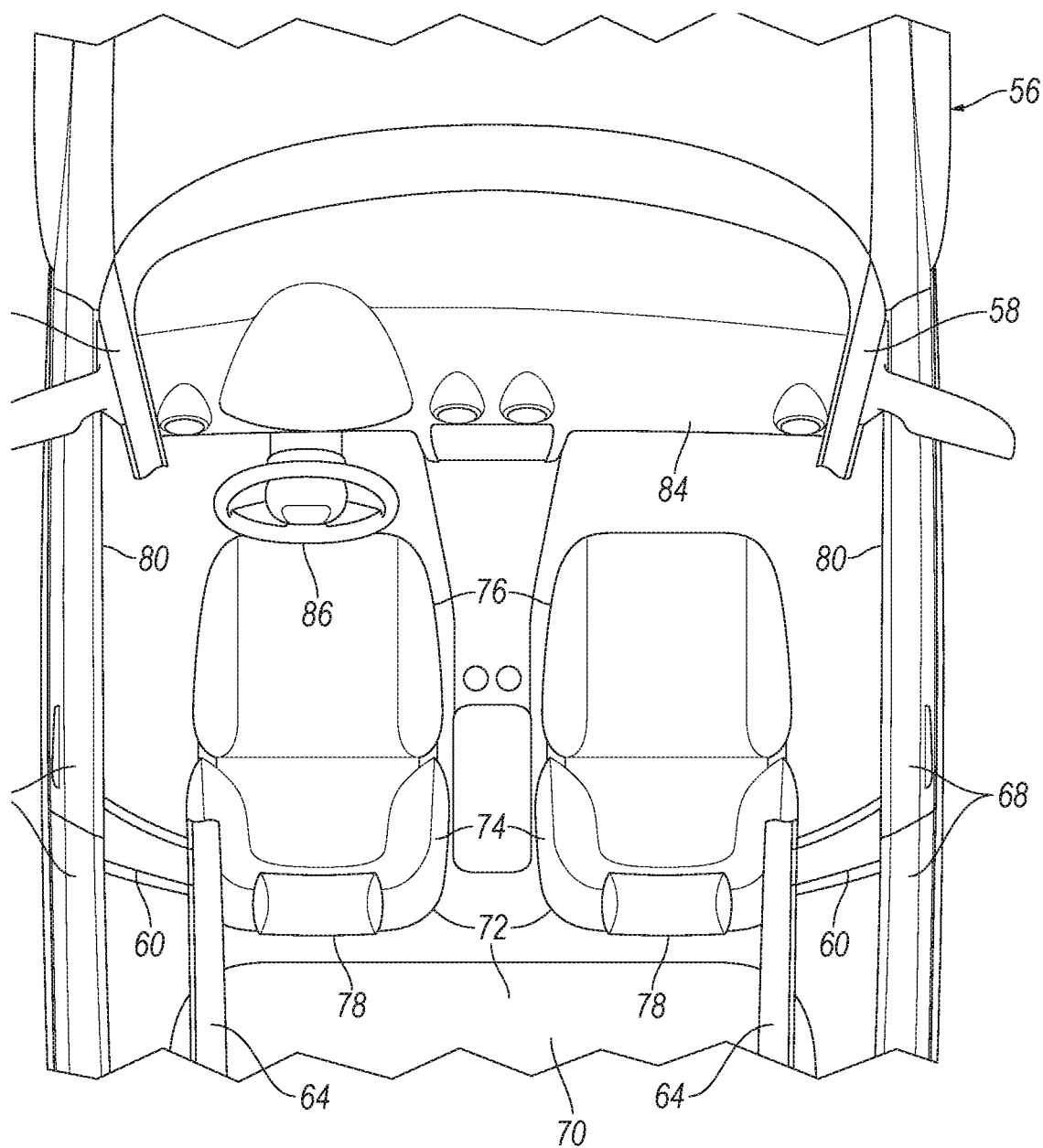
FIG. 3 is a top view of the passenger cabin of the vehicle.

With reference to FIG. 3, the passenger cabin 70 includes an instrument panel 84. The instrument panel 84 may be disposed at a forward end of the passenger cabin 70 and face toward the front seats 72. The instrument panel 84 may include vehicle controls, such as a steering wheel 86; gauges, dials, and information displays; heating and ventilation equipment; a radio and other electronics; etc. The steering wheel 86 is coupled to the body 56 and thus to the roof rail trim 82 via the instrument panel 84. The steering wheel 86 is rotatable relative the instrument panel 84. The steering wheel 86 may be adjustable relative to the instrument panel 84 within a range of positions.

Figure 4:
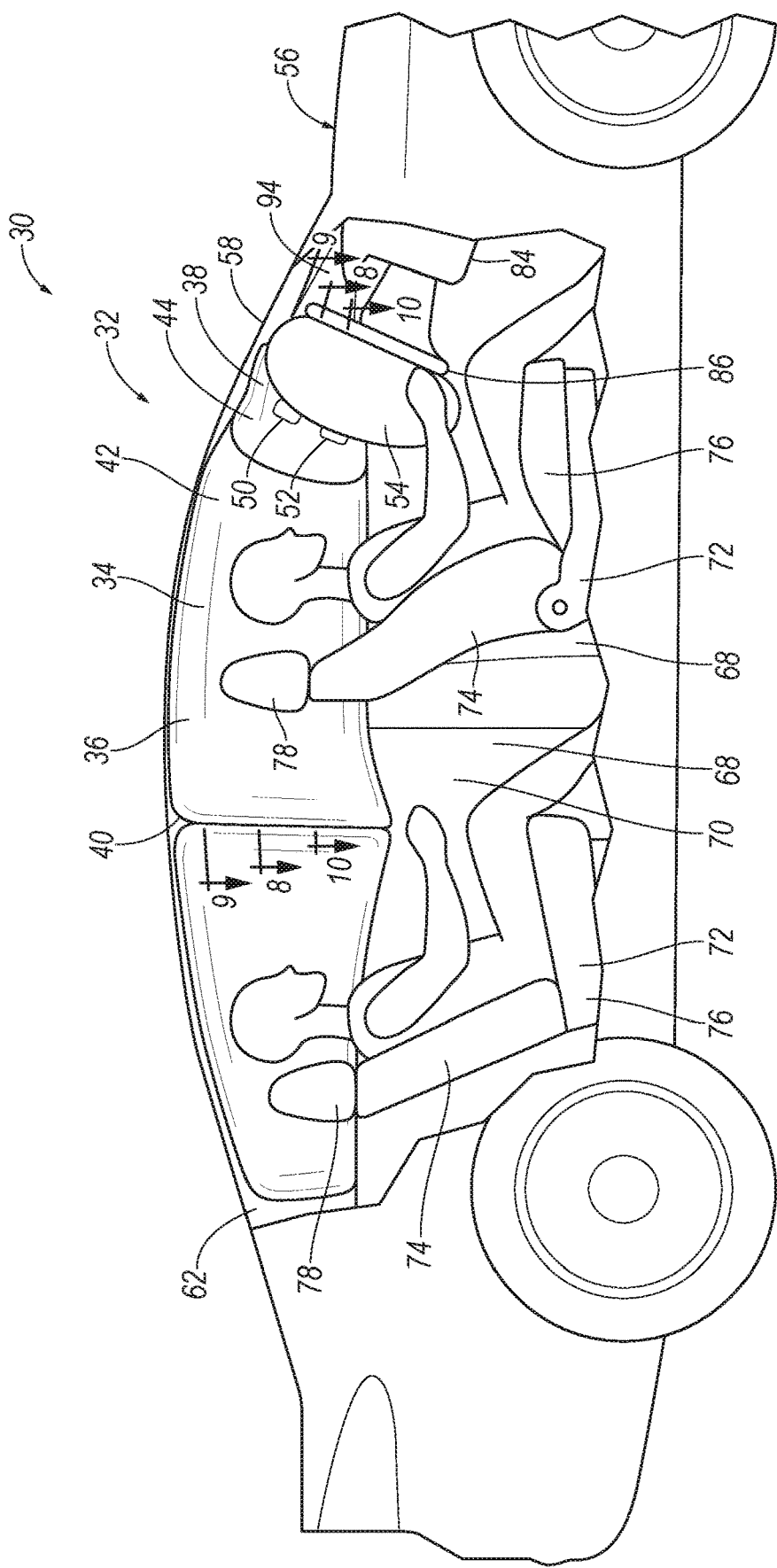
FIG. 4 is a side view of the passenger cabin with airbags in inflated positions.
Figure 5:
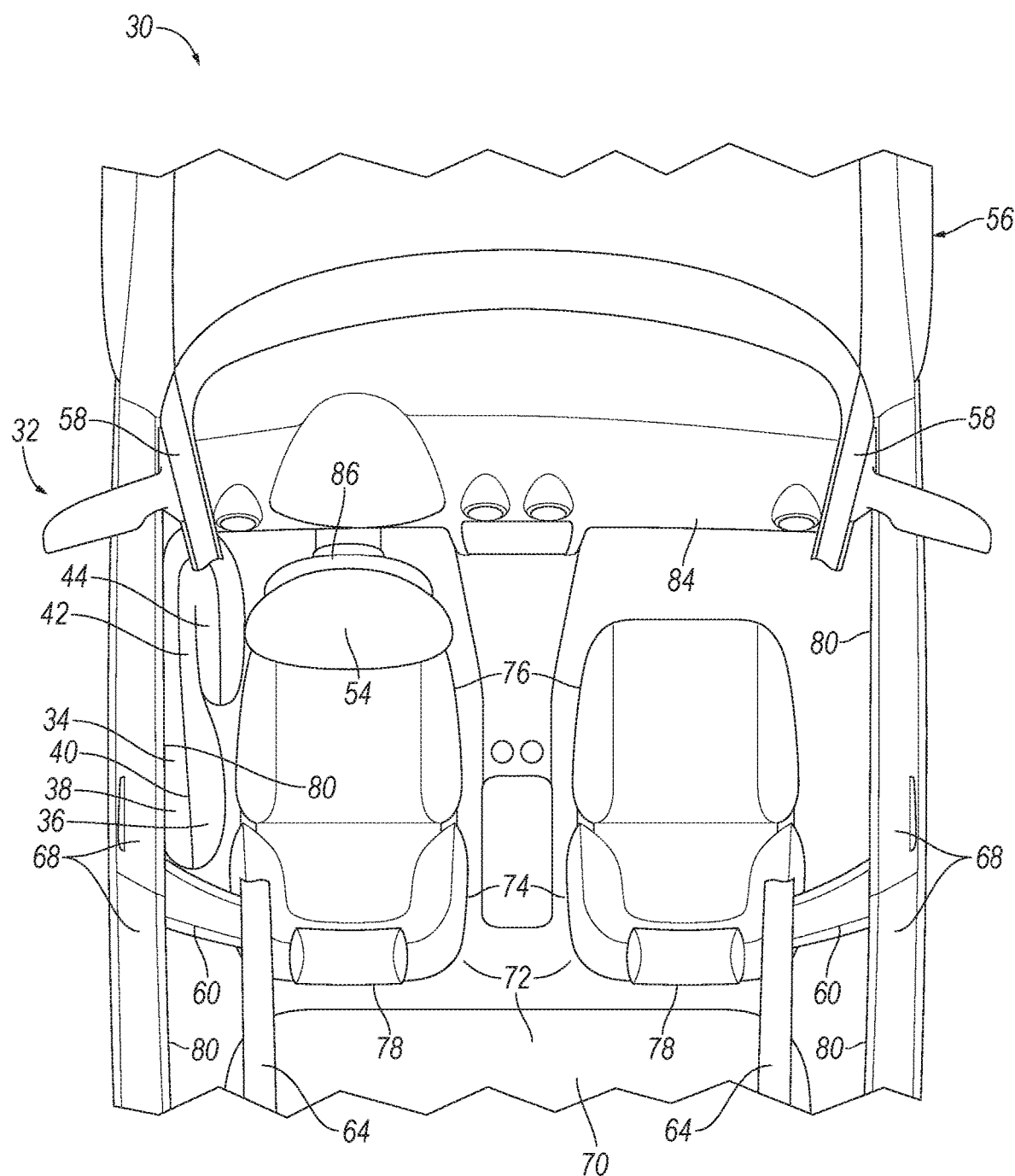
FIG. 5 is a top view of the passenger cabin with the airbags in the inflated positions.

With reference to FIGS. 4 and 5, the side curtain airbag 34 is inflatable from an uninflated position to an inflated position. The side curtain airbag 34 is attached to the roof rail 64. The side curtain airbag 34 in the uninflated position is folded inside the roof rail trim 82; i.e., the roof rail trim 82 covers the side curtain airbag 34 in the uninflated position, as shown in FIG. 2. The side curtain airbag 34 in the inflated position extends adjacent at least one of the doors 68. The side curtain airbag 34 in the inflated position covers one of the window openings 80 adjacent the roof rail trim 82. The side curtain airbag 34 in the inflated position may extend from the roof rail 64 to the door 68 below the window opening 80 and may extend from the A pillar 58 to the B pillar 60. The vehicle 30 may include a second side curtain airbag (unnumbered) longitudinally behind the side curtain airbag 34 relative to the vehicle 30.

The restraint system 32 can include a driver airbag 54. The driver airbag 54 is inflatable from an uninflated position to an inflated position. The driver airbag 54 in the uninflated position is enclosed in the steering wheel 86. The driver airbag 54 in the inflated position extends rearward from the steering wheel 86 toward the seat back 74 of the driver seat 72.

Inflators 88 are connected to the side curtain airbag 34 and to the driver airbag 54. Specifically, the inflator 88 for the side curtain airbag 34 is in fluid communication with an inflation chamber 90 of the side curtain airbag 34. Upon receiving a signal from, e.g., a controller, the inflators 88 may inflate the airbag with an inflation medium, such as a gas. The inflators 88 may be, for example, a pyrotechnic inflator that uses a chemical reaction to drive inflation medium to the airbag. The inflators 88 may be of any suitable type, for example, a cold-gas inflator.

With reference to FIG. 6, the side curtain airbag 34 includes the inboard panel 36 and the outboard panel 38. The inboard panel 36 and the outboard panel 38 can have generally the same shape. The inboard panel 36 and the outboard panel 38 are longer than the window opening 80 and at least as tall as the window opening 80. The length and height permit the side curtain airbag 34 to cover the window opening 80, and the extra length beyond the length of the window opening 80 permits creation of the folded-over portion 44. The inboard panel 36 and the outboard panel 38, for example, may each be unitary, i.e., a single piece of material with no seams, joints, or adhesives holding the inboard panel 36 together and the outboard panel 38 together. In such an example, the inboard panel 36 and the outboard panel 38 are each formed together simultaneously as a single continuous unit, e.g., a one-piece woven process. In other words, in such an example, the inboard panel 36 and the outboard panel 38 are each not multiple panels stitched together, which can simplify manufacturing of the side curtain airbag 34.

The side curtain airbag 34, specifically the inboard panel 36 and outboard panel 38, and the driver airbag 54 may be formed of any suitable airbag material, for example, a woven polymer. For example, the airbags 34, 54 may be formed of woven nylon yarn, for example, nylon 6-6. Other suitable examples include polyether ether ketone (PEEK), polyetherketoneketone (PEKK), polyester, or any other suitable polymer. The woven polymer may include a coating, such as silicone, neoprene, urethane, and so on. For example, the coating may be polyorgano siloxane.

With reference to FIG. 7, the perimeter 40 extends along and defines the outer edges of the inboard panel 36 and the outboard panel 38. The perimeter 40 connects the inboard panel 36 and the outboard panel 38 to each other along an entirety of the outer edges of the inboard panel 36 and the outboard panel 38. The perimeter 40 can be formed by stitching the inboard panel 36 and the outboard panel 38 together along the outer edges. Alternatively, the perimeter 40 can be formed by weaving the inboard panel 36 and the outboard panel 38 with the outer edges woven together rather than weaving the inboard panel 36 and the outboard panel 38 as completely separate panels; i.e., the inboard panel 36 and the outboard panel 38 may together be unitary, i.e., a single piece of material with no seams, joints, or adhesives holding the inboard panel 36 and the outboard panel 38 together.

With reference to FIGS. 6 and 7, the side curtain airbag 34 includes the main portion 42 formed of part of the inboard panel 36 and part of the outboard panel 38. The parts of the inboard panel 36 and outboard panel 38 forming the main portion 42 are at least as long as the window opening 80 (or at least as long as the window opening 80 minus a sail panel 94 described below) so that the main portion 42 can cover the window opening 80 when the side curtain airbag 34 is in the inflated position. When the side curtain airbag 34 is in the inflated position, the inboard panel 36 forming the main portion 42 faces inboard, i.e., toward a longitudinal centerline of the vehicle 30, and the outboard panel 38 forming the main portion 42 faces outboard, i.e., away from the longitudinal centerline of the vehicle 30.

The side curtain airbag 34 includes the folded-over portion 44 formed of part of the inboard panel 36 and part of the outboard panel 38, specifically of the parts of the inboard panel 36 and outboard panel 38 not forming the main portion 42. All of the inboard panel 36 and all of the outboard panel 38 forms either the main portion 42 or the folded-over portion 44. The parts of the inboard panel 36 and outboard panel 38 forming the folded-over portion 44 are smaller than the respective parts of the inboard panel 36 and outboard panel 38 forming the main portion 42. The side curtain airbag 34 is folded so that the inboard panel 36 of the folded-over portion 44 abuts the inboard panel 36 of the main portion 42. When the side curtain airbag 34 is in the inflated position, the inboard panel 36 forming the folded-over portion 44 faces outboard, i.e., toward the main portion 42, and the outboard panel 38 forming the folded-over portion 44 faces inboard, i.e., away from the main portion 42.

With reference to FIG. 7, the main portion 42 includes the first main-portion dead zone 46 and a second main-portion dead zone 48. The folded-over portion 44 includes the first folded-over-portion dead zone 50 and a second folded-over-portion dead zone 52. The dead zones 46, 48, 50, 52 are regions at which the inboard panel 36 and outboard panel 38 are connected to each other. The dead zones 46, 48, 50, 52 are a noninflating portion of the side curtain airbag 34. The inflation chamber 90 extends around the dead zones 46, 48, 50, 52. The dead zones 46, 48, 50, 52 can be formed by stitching around exteriors of the dead zones 46, 48, 50, 52. Alternatively, the dead zones 46, 48, 50, 52 can be formed by weaving the inboard panel 36 and the outboard panel 38 with the regions forming the dead zones 46, 48, 50, 52 woven together rather than weaving the inboard panel 36 and the outboard panel 38 as completely separate panels.

The dead zones 46, 48, 50, 52 are each spaced from the perimeter 40. The first and second main-portion dead zones 46, 48 are spaced from each other vertically, i.e., in a vertical direction of the side curtain airbag 34 when the side curtain airbag 34 is in the inflated position. The first main-portion dead zone 46 is positioned directly above the second main-portion dead zone 48 when the side curtain airbag 34 is in the inflated position. The first and second folded-over-portion dead zones 50, 52 are spaced from each other vertically, i.e., in a vertical direction of the side curtain airbag 34 when the side curtain airbag 34 is in the inflated position. The first folded-over-portion dead zone 50 is positioned directly above the second folded-over-portion dead zone 52 when the side curtain airbag 34 is in the inflated position.

Returning to FIG. 6, when the side curtain airbag 34 is in the inflated position, the perimeter 40 of the main portion 42 is disconnected from the perimeter 40 of the folded-over portion 44 except where the perimeter 40 transitions from the main portion 42 to the folded-over portion 44. The folded-over portion 44 connects to the main portion 42 at a vehicle-forward end of the main portion 42.

Figure 8:
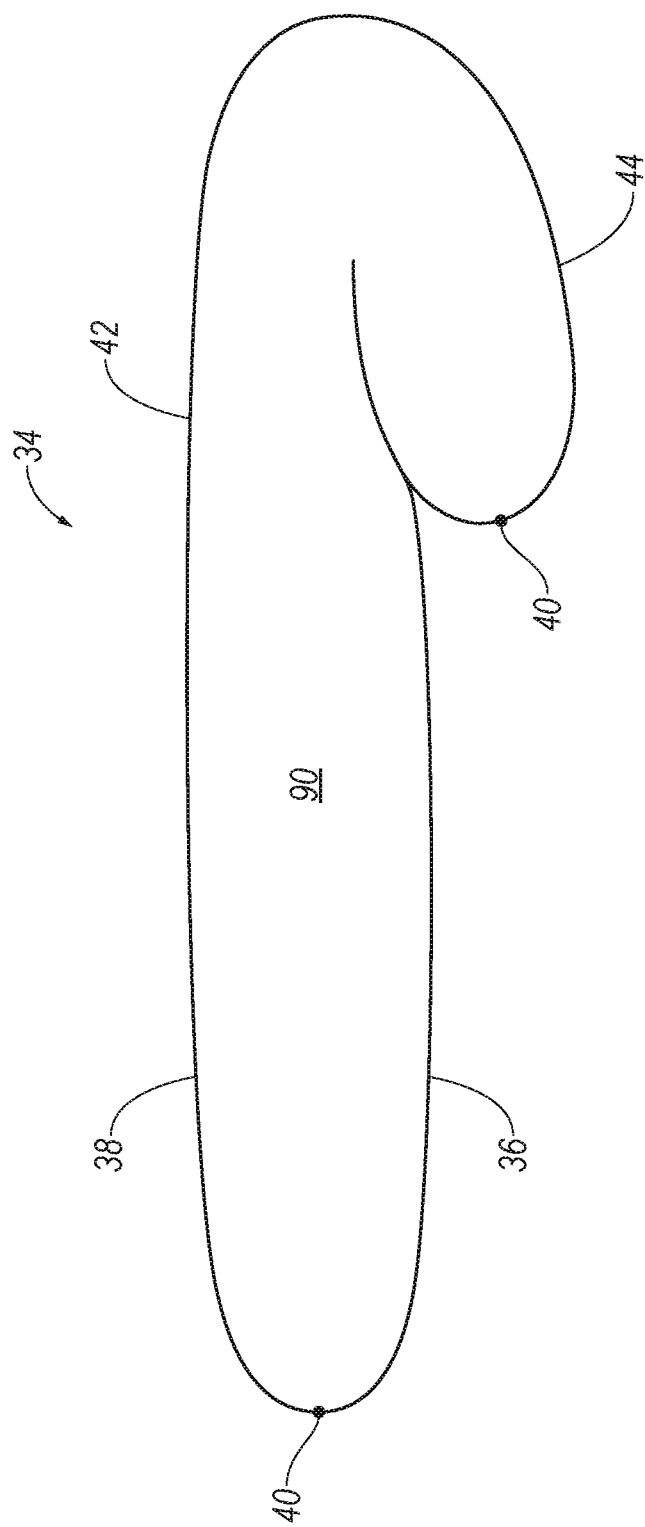
FIG. 8 is a top cross-sectional view of the side curtain airbag in the inflated position.

With reference to FIG. 8, the inboard panel 36 and the outboard panel 38 enclose the inflation chamber 90 of the side curtain airbag 34. The inflation chamber 90 extends through the main portion 42 and the folded-over portion 44. The inflation chamber 90 extends around the dead zones 46, 48, 50, 52. The main portion 42 and folded-over portion 44 are open to each other along an entire height of the side curtain airbag 34 from the perimeter 40 at the top to the perimeter 40 at the bottom.

With reference to FIGS. 9 and 10, the main portion 42 and the folded-over portion 44 are attached to each other at the respective first dead zones 46, 50, as well as at the respective second dead zones 48, 52. The first folded-over-portion dead zone 50 is attached to the first main-portion dead zone 46. The second folded-over-portion dead zone 52 is attached to the second main-portion dead zone 48. The attachments of the dead zones 46, 48, 50, 52 keep the folded-over portion 44 in a folded position relative to the main portion 42. The folded-over portion 44 is only attached to the main portion 42 where the inboard panel 36 and outboard panel 38 transition from the main portion 42 to the folded-over portion 44 at the vehicle-forward end of the side curtain airbag 34, and at the dead zones 46, 48, 50, 52.

The main-portion dead zones 46, 48 can be attached to the folded-over-portion dead zones 50, 52 by stitching. The first main-portion dead zone 46 can be stitched to the first folded-over-portion dead zone 50, and the second main-portion dead zone 48 can be stitched to the second folded-over-portion dead zone 52. Alternatively, the first main-portion dead zone 46 can be woven together with the first folded-over-portion dead zone 50, and the second main-portion dead zone 48 can be woven together with the second folded-over-portion dead zone 52.

Figure 11:
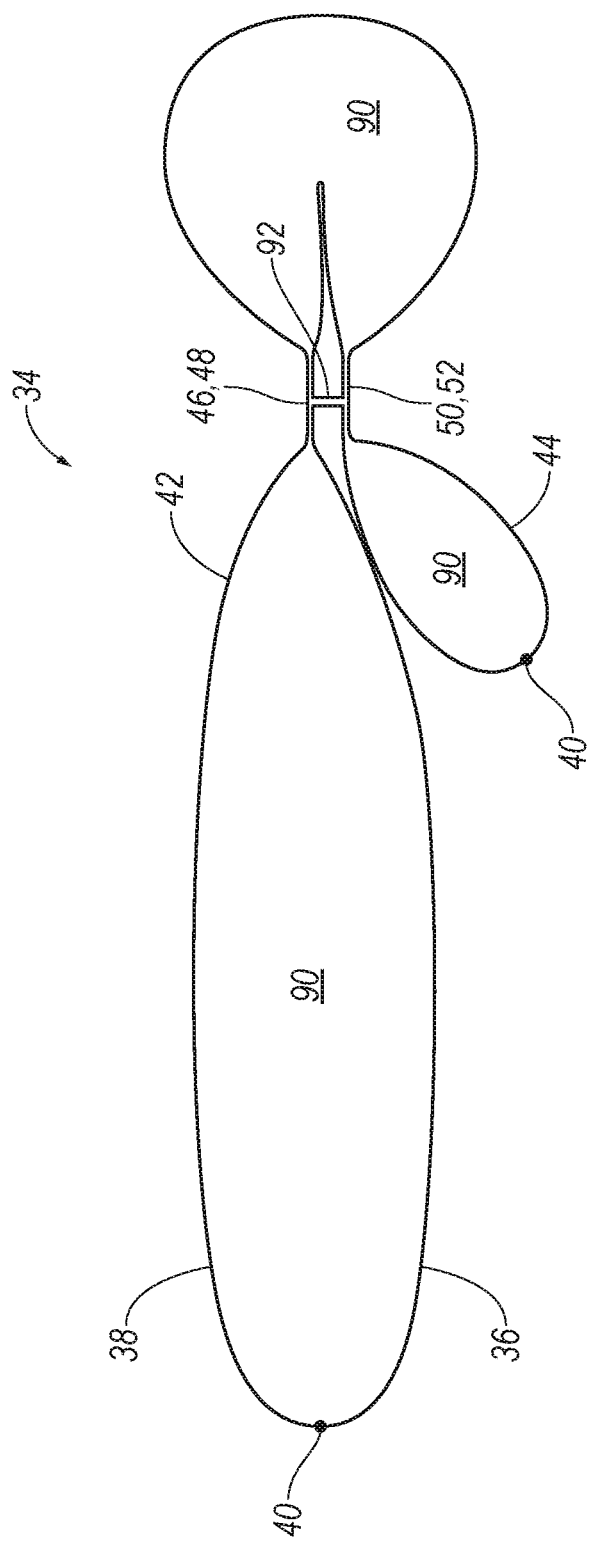
FIG. 11 is a top cross-sectional view of another example of the side curtain airbag.

Alternatively, with reference to FIG. 11, the restraint system 32 can include tethers 92 attaching the main-portion dead zones 46, 48 to the folded-over-portion dead zones 50, 52. One tether 92 can be attached at the first main-portion dead zone 46 and at the first folded-over portion 44 dead zone, and one tether 92 can be attached at the second main-portion dead zone 48 and at the second folded-over-portion dead zone 52. The tethers 92 extend outside the inflation chamber 90. The tethers 92 are sufficiently short to keep the folded-over portion 44 lying against the main portion 42 when the side curtain airbag 34 is in the inflated position.

Figure 12:
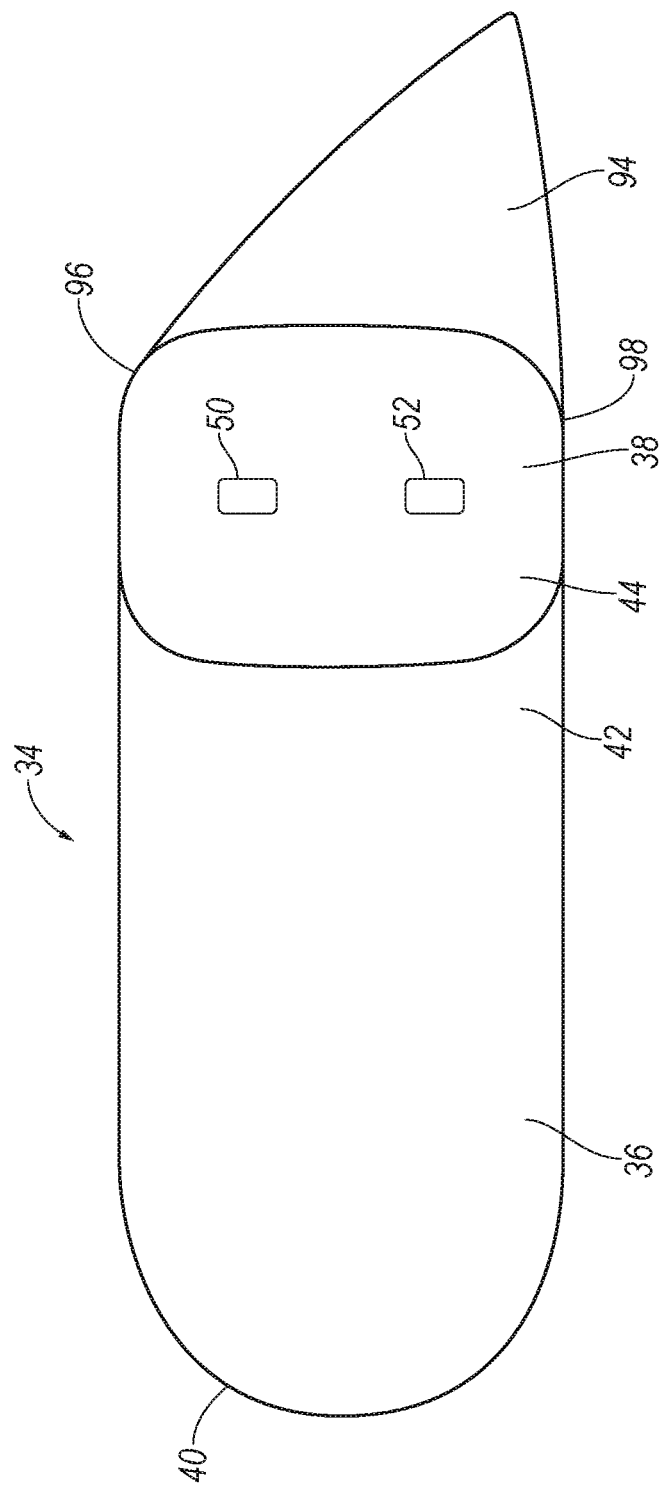
FIG. 12 is a side view of the side curtain airbag in the inflated position.

With reference to FIG. 12, the restraint system 32 can include a sail panel 94 connected to the side curtain airbag 34. The sail panel 94 may be connected to the side curtain airbag 34 where the inboard panel 36 and the outboard panel 38 transition from the main portion 42 to the folded-over portion 44, i.e., at a vehicle-forwardmost end of the side curtain airbag 34. The sail panel 94 can be connected only at the perimeter 40 of the side curtain airbag 34. For example, the sail panel 94 can be connected to the side curtain airbag 34 only at an upper connection point 96 on the perimeter 40 where the side curtain airbag 34 transitions from the main portion 42 to the folded-over portion 44 and at a lower connection point 98 on the perimeter 40 where the side curtain airbag 34 transitions from the main portion 42 to the folded-over portion 44. The sail panel 94 has a generally triangular shape with one side extending vertically along the side curtain airbag 34 from the upper connection point 96 to the lower connection point 98. The sail panel 94 extends forward from the side curtain airbag 34. The sail panel 94 is a single panel and is thus noninflatable.

Returning to FIGS. 4 and 5, when the side curtain airbag 34 is in the inflated position, the main portion 42 can be at least twice as long as the folded-over portion 44 along a vehicle-forward direction of the side curtain airbag 34. When the side curtain airbag 34 and the driver airbag 54 are in the inflated positions, the folded-over portion 44 extends farther in a vehicle-rearward direction than the driver airbag 54 does. When the side curtain airbag 34 and the driver airbag 54 are in the inflated positions, the outboard panel 38 of the folded-over portion 44 contacts the driver airbag 54. This positioning of the folded-over portion 44 permits the folded-over portion 44 to possibly prevent the head of the driver from passing between the driver airbag 54 and the side curtain airbag 34 during an oblique impact to the vehicle 30.

The disclosure has been described in an illustrative manner, and it is to be understood that the terminology which has been used is intended to be in the nature of words of description rather than of limitation. Terms such as "front," "forward," "back," "rearward," "left," "right," "lateral," etc., are understood relative to the vehicle 30. Many modifications and variations of the present disclosure are possible in light of the above teachings, and the disclosure may be practiced otherwise than as specifically described.

What is claimed is:

1. A side curtain airbag comprising:
an inboard panel;
an outboard panel;
a perimeter at which the inboard panel and the outboard panel are connected to each other;
a main portion including part of the inboard panel and part of the outboard panel; and
a folded-over portion including part of the inboard panel and part of the outboard panel;
the main portion including a main portion dead zone at which the inboard panel and the outboard panel are connected to each other, the main portion dead zone being spaced from the perimeter;
the folded-over portion including a folded-over portion dead zone at which the inboard panel and the outboard panel are connected to each other, the folded-over portion dead zone being spaced from the perimeter;
the inboard panel of the folded-over portion abutting the inboard panel of the main portion;
the main portion and the folded-over portion being attached to each other at the main portion dead zone and the folded-over portion dead zone; and
the outboard panel of the folded-over portion facing inboard.

2. The side curtain airbag of claim 1, wherein the inboard panel and the outboard panel enclose an inflation chamber, and the inflation chamber extends through the main portion and the folded-over portion.

3. The side curtain airbag of claim 2, further comprising a tether attaching the main portion dead zone and the folded-over portion dead zone, wherein the tether extends outside the inflation chamber.

4. The side curtain airbag of claim 1, wherein the main portion dead zone and the folded-over portion dead zone are one of stitched together and woven together.

5. The side curtain airbag of claim 1, further comprising a sail panel connected to the side curtain airbag.

6. The side curtain airbag of claim 5, wherein the sail panel is connected to the side curtain airbag where the inboard panel and the outboard panel transition from the main portion to the folded-over portion.

7. The side curtain airbag of claim 5, wherein the sail panel is connected to the perimeter of the side curtain airbag.

8. The side curtain airbag of claim 7, wherein the sail panel is connected to the side curtain airbag only at an upper connection point on the perimeter and at a lower connection point on the perimeter.

9. The side curtain airbag of claim 5, wherein the sail panel is connected to the perimeter of the side curtain airbag at the perimeter.

10. The side curtain airbag of claim 1, wherein the main portion dead zone is a first main portion dead zone, the main portion includes a second main portion dead zone, the folded-over portion dead zone is a first folded-over portion dead zone, the folded-over portion includes a second folded-over portion dead zone, and the main portion and the folded-over portion are attached to each other via the respective second dead zones.

11. The side curtain airbag of claim 10, wherein the side curtain airbag is inflatable to an inflated position, the first and second main portion dead zones are spaced from each other in a vertical direction of the side curtain airbag when the side curtain airbag is in the inflated position, and the first and second folded-over portion dead zones are spaced from each other in the vertical direction of the side curtain airbag when the side curtain airbag is in the inflated position.

12. The side curtain airbag of claim 1, wherein the side curtain airbag is inflatable to an inflated position, and the main portion is at least twice as long as the folded-over portion along a vehicle-forward direction of the side curtain airbag when the side curtain airbag is in the inflated position.

13. The side curtain airbag of claim 1, wherein the perimeter of the main portion is disconnected from the perimeter of the folded-over portion except where the perimeter transitions from the main portion to the folded-over portion.

14. A system comprising:
  a side curtain airbag including an inboard panel, an outboard panel, a perimeter at which the inboard panel and the outboard panel are connected to each other, a main portion including part of the inboard panel and part of the outboard panel, and a folded-over portion including part of the inboard panel and part of the outboard panel;
  a roof-rail trim enclosing the side curtain airbag;
  a steering wheel coupled to the roof-rail trim; and
  a driver airbag enclosed in the steering wheel;
  the main portion including a main portion dead zone at which the inboard panel and the outboard panel are connected to each other, the main portion dead zone being spaced from the perimeter;
  the folded-over portion including a folded-over portion dead zone at which the inboard panel and the outboard panel are connected to each other, the folded-over portion dead zone being spaced from the perimeter;
  the inboard panel of the folded-over portion abutting the inboard panel of the main portion;
  the main portion and the folded-over portion being attached to each other at the main portion dead zone and the folded-over portion dead zone; and
  the side curtain airbag and the driver airbag being inflatable to inflated positions, and when the side curtain airbag and the driver airbag are in the inflated positions, the outboard panel of the folded-over portion contacting the driver airbag.

15. The system of claim 14, wherein when the side curtain airbag and the driver airbag are in the inflated positions, the folded-over portion extends farther in a vehicle-rearward direction than the driver airbag does.

16. The system of claim 14, wherein the folded-over portion is connected to the main portion at a vehicle-forward end of the main portion.

17. The system of claim 14, wherein the side curtain airbag covers a window opening adjacent the roof-rail trim when the side curtain airbag is in the inflated position.

* * * * *